United States Patent [19]

Helmstetter

[11] 4,117,722
[45] Oct. 3, 1978

[54] MEASURING APPARATUS PROVIDING SEPARATE ANALOG AND DIGITAL OUTPUTS

[75] Inventor: Paul M. Helmstetter, Littleton, Colo.

[73] Assignee: Honeywell Inc., Minneapolis, Minn.

[21] Appl. No.: 851,482

[22] Filed: Nov. 14, 1977

[51] Int. Cl.² ............................................. G01K 7/22
[52] U.S. Cl. .............................................. 73/362 AR
[58] Field of Search .................................. 73/362 AR

[56] References Cited

U.S. PATENT DOCUMENTS

| 3,829,852 | 8/1974 | Nilsson et al. | 340/347 NT |
|---|---|---|---|
| 3,842,371 | 10/1974 | Kelley | 331/143 |
| 3,911,374 | 10/1975 | Busse | 73/362 |
| 3,939,459 | 2/1976 | Hoopes | 340/347 NT |
| 3,999,123 | 12/1976 | Thoener | 324/99 D |

OTHER PUBLICATIONS

Considine, D. M.; Process Instruments and Controls Handbook, 2nd Ed., McGraw-Hill, 1974, pp. 2-50 & 2-51.

*Primary Examiner*—S. Clement Swisher
*Attorney, Agent, or Firm*—Laurence J. Marhoefer; Lockwood D. Burton; Mitchell J. Halista

[57] ABSTRACT

A capacitive integrator passes a current through a non-linearity compensating transistor, a thermistor, and an analog output amplifier and resistor so that the value of the current and the value of the voltage across the resistor are proportional to the thermistor temperature. A comparator detects each passage of the integrator output voltage above zero, and causes the output of a flip-flop to go high upon such passage for a fixed time period during which an opposing current is passed through the integrator capacitor to drive the integrator output voltage below zero. The resulting pulses in the flip-flop output are counted by a presettable counter for a predetermined counting period to give a count which is proportional to the thermistor current and temperature. This count is decimally displayed and is made numerically equal to the thermistor temperature according to any desired temperature scale by suitably selecting the length of the counting period and the preset count of the counter.

8 Claims, 2 Drawing Figures

MEASURING APPARATUS PROVIDING SEPARATE ANALOG AND DIGITAL OUTPUTS

BACKGROUND OF THE INVENTION

1. Field of the Invention

The present invention relates generally to temperature measuring apparatus of the type employing a temperature responsive electrical element, such as a thermistor, as the temperature sensor. Specifically, the invention relates to that form of such apparatus which provides both analog and digital outputs which are representative of the temperature sensed by the sensor.

2. Description of the Prior Art

It is well known to provide temperature measuring apparatus of the form noted above which produces both analog and digital outputs which represent the value of the temperature to which the sensor of the apparatus is exposed. An example of such known apparatus is that which is disclosed in FIG. 11 on Page 2-51 of the book entitled "Process Instruments And Controls Handbook", Second Edition, edited by Douglas M. Considine, and published by the MacGraw-Hill Book Company in 1974. In such apparatus, the output of the sensor is amplified by an analog amplifier, and the output voltage of the amplifier is the analog output which is representative of the sensed temperature. The digital output of the apparatus is obtained by applying the analog output voltage to an analog to digital converter, such as a voltage to count converter. The output of the latter is the digital output of the apparatus.

In apparatus as just described, compensation for non-linearity in the resistance vs. temperature characteristic of the sensor is usually done by suitably adjusting the gain of the analog amplifier. Adjustments for different scale factors are usually effected in a second analog amplifier, since making such adjustments to the first or compensation amplifier necessitates making similar adjustments to the compensation. A disadvantage inherent in such apparatus is that whatever errors appear in the analog output signal, due to the above-noted amplifiers, similar degrade the digital output.

SUMMARY OF THE INVENTION

Accordingly, it is an object of the present invention to provide an improved temperature measuring apparatus which is not subject to the above-noted disadvantage. Thus, it is a specific object of the invention to provide an improved temperature measuring apparatus which produces both an analog output and a digital output, but wherein these two outputs are separately derived so that an error in one does not introduce an error into the other. Another object of the invention is to provide such improved apparatus wherein non-linearity compensation and scale factor changes are readily effected without the introduction of appreciable errors into either of the outputs.

To the end of accomplishing the above-noted and other desirable objects, the improved temperature measuring apparatus according to the invention does not derive its digital output from the analog output. Instead, each of those outputs is separately and directly derived from a current which is caused to flow through the sensor. This sensor current is readily adjusted for effecting whatever non-linearity compensation is desired. One portion of the apparatus derives the analog output directly from the sensor current. Another portion of the apparatus derives a pulse signal with a repetition rate which is determined by the value of the sensor current. The pulses of this signal are counted to form the digital output. Changes in scale factor are readily achieved, without introducing error, by simply varying the counting period and adding any necessary offset.

BRIEF DESCRIPTION OF THE DRAWING

A better understanding of the present invention may be had from the following detailed description when read in connection with the accompanying drawing, wherein.

DETAILED DESCRIPTION

Figure 1:
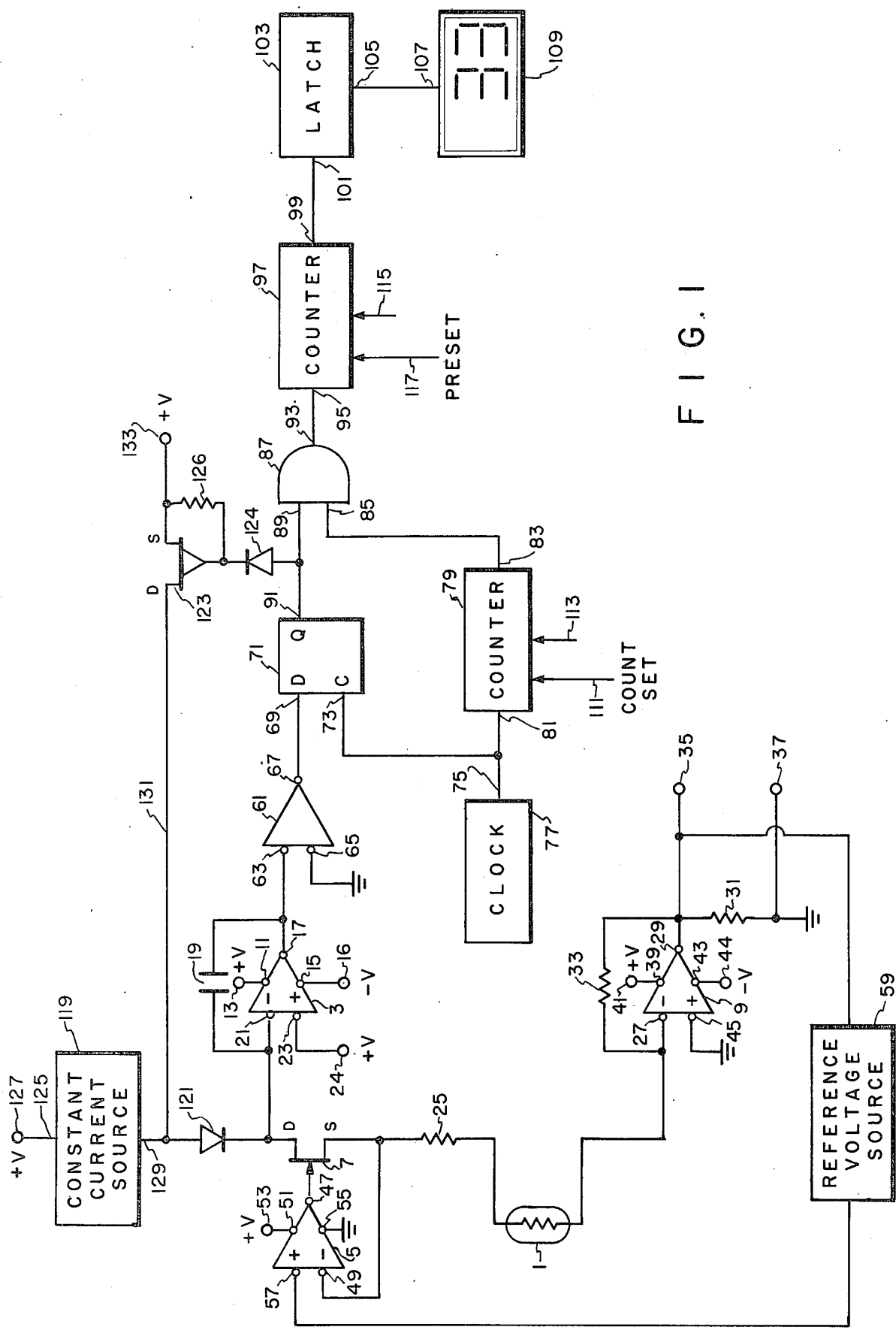
FIG. 1 shows the schematic circuit diagram of temperature measuring apparatus which respresents a preferred embodiment of the above-noted improved apparatus according to the present invention.

The Apparatus of FIG. 1

The apparatus shown in FIG. 1, and illustrating a preferred example of the above-noted improved temperature measuring apparatus embodying the present invention, is designed to provide an analog output signal and a digital display, both of which represent the temperature to which a sensor, in the form of a thermistor 1, is exposed. Further, the apparatus is arranged to derive each of these two output effects separately and directly from a current which is caused to flow through the thermistor 1. To this end, the apparatus includes an operational amplifier 3 which is used as an integrator to pass the above-noted current through the thermistor 1, an operational amplifier 5 and a field effect transistor (FET) 7 which are arranged to provide compensation for the non-linearity of the thermistor resistance vs. temperature characteristic, an operational amplifier 9 which is arranged to derive the analog output signal from the thermistor current, and other components, to be described hereinafter, which collectively constitute a means for deriving from the thermistor current digital output signals for controlling the digital display.

In the illustrated apparatus as just briefly described, the positive energizing terminal 11 of the amplifier 3 is connected to a positive supply voltage terminal 13. The negative energizing terminal 15 of the amplifier 3 is connected to a negative supply voltage terminal 16 of a suitable source of voltage, not shown, the positive side of which is connected to a common connection of the apparatus which will be referred to hereinafer simply as ground. Such negative supply voltage terminals carry the notation −V herein. It is assumed that each of the positive supply voltage terminals of the apparatus is connected to the positive side of a suitable source of voltage, not shown, the negative side of which is connected to ground. Such positive supply voltage terminals carry the notation +V herein.

The output terminal 17 of the amplifier 3 is connected through an integrating capacitor 19 to the inverting input terminal 21 of the amplifier 3, and to the drain of the FET 7. The non-inverting input terminal 23 of the amplifier 3 is connected to a positive supply voltage terminal 24.

The source of FET 7 is connected through a resistor 25 and the thermistor 1 to the inverting input terminal 27 of the analog output amplifier 9. The output terminal 29 of the latter is connected through a resistor 31 to ground. The output terminal 29 is also connected through a feedback resistor 33 to the inverting input terminal 27. Analog output signal terminals 35 and 37 are connected to respective ends of the resistor 31. The connections to the amplifier 9 are completed by the connection of the positive energizing terminal 39 to a positive supply voltage terminal 41, by the connection of the negative energizing terminal 43 to a negative supply voltage terminal 44, and by the connection of the non-inverting input terminal 45 to ground.

As a result of having the connections just described, the above-noted thermistor current flows in a path which can be traced from the amplifier energizing terminal 11 and through the amplifier 3, the output terminal 17, the capacitor 19, the FET 7, the resistor 25, the thermistor 1, the resistor 33, and the amplifier 9 to the terminal 44. A voltage which is proportional to this current appears between the analog output terminals 35 and 37, and that voltage constitutes the analog output signal of the apparatus.

As previously noted, the amplifier 5 and the FET 7 cooperate to provide compensation for non-linearity of the thermistor resistance vs. temperature characteristic. To this end, the output terminal 47 of the amplifier 5 is connected to the gate of the FET 7, and the source of the latter is connected to the amplifier inverting input terminal 49. The amplifier positive energizing terminal 51 is connected to a positive supply voltage terminal 53, and the amplifier negative energizing terminal 55 is connected to ground. Finally, the amplifier non-inverting input terminal 57 is connected to a reference voltage source 59 which is shown as being controlled by the analog output signal appearing on the output terminal 35.

The connections just described are such that the amplifier 5 causes the FET 7 to operate in the depletion mode to make the value of the voltage at the source of the FET 7 equal to the value of the reference voltage applied to the amplifier input terminal 57 by the source 59. Since the value of the voltage at the FET source establishes the value of the thermistor current for the existing value of the thermistor temperature, the value of the reference voltage on the terminal 57 likewise establishes the thermistor current for the existing thermistor temperature. The source 59 may well be a so-called break point function generator which, under the control of the analog output signal, causes the value of the reference voltage on the amplifier input terminal 57 to be so determined in accordance with both the value of the analog output signal and the thermistor resistance vs. temperature characteristic that the desired degree of linearization of the thermistor current vs. temperature characteristic is produced. The amplifier 5 and the FET 7 are desirably so chosen as to cause no significant difference between the drain current of the FET 7 and the thermistor current.

The components which derive the digital output from the thermistor current include a voltage comparator 61, one input terminal 63 of which is connected to the output terminal 17 of the integrating amplifier 3. The other input terminal 65 of the comparator 61 is connected to ground. The output terminal 67 of the comparator 61 is connected to the D input 69 of a D-type flip-flop 71. The clock input 73 of the latter is connected to the output 75 of a clock or oscillator 77. The latter produces on the output 75, and hence at the clock input 73, a clock signal of a fixed frequency. This signal may well be in the form of a square wave signal of fifty percent duty cycle.

A counter 79 has an input 81 which is connected to the clock output 75, whereby the counter 79 receives the clock signal. The output 83 of the counter 79 is connected to one input 85 of an AND gate 87, the other input 89 of which is connected to the Q output 91 of the flip-flop 71. The output 93 of the gate 87 is connected to the input 95 of a presettable counter 97, the output 99 of which is connected to the input 101 of a latch 103. The output 105 of the latter is connected to the input 107 of a digital display or readout device 109. The latter is shown, by way of example, as being of the seven-segment type.

The counter 79 is of the known form in which resetting of the counter causes it to switch its output 83 from a low state to a high state, and simultaneously causes the counter to start counting the pulses of the applied clock signal. When the counter 79 has counted a predetermined number of such pulses, the output 83 is switched from the high state to a low state, which obtains until the counter is next reset. The said predetermined number is selected by means of a count setting connection 111. The counter 79 is also provided with a reset connection 113.

The counter 97 is of the known form in which receipt of a reset signal on a connection 115 first causes the counter to place its existing count on its output 99 for updating the count stored in the latch 103, and then causes the counter to clear and to start counting, from a preset count, pulses applied to its input 95. The value of said preset count is set by means of a connection 117. The counter 97 may well consist of a number of presettable decade ripple counters.

The latch 103 stores the last count received from the output 99 of the counter 97 and decodes that count so that it is properly displayed in decimal form by the device 109. The latch 103 may well consist of a number of BCD to seven segment decoder/drivers with latches.

The above-noted pulses appearing at the input 95 of counter 97 are produced by switching means which include a constant current source 119, a diode 121, an FET 123 which is operated in the depletion mode, a protection diode 124, and a bias resistor 126. The input 125 of the constant current source 119 is connected to a positive supply voltage terminal 127. The output 129 of the source 119 is connected to the anode of the diode 121, which is also connected by a conductor 131 to the drain of the FET 123. The cathode of the diode 121 is connected to the inverting input terminal 21 of the integrating amplifier 3. The source of the FET 123 is connected to a positive supply voltage terminal 133, and the gate of the FET 123 is connected through the diode 124 to the Q output 91 of the flip-flop 71. The resistor 126 is connected between the gate and source of the FET 123. The supply voltage at the terminal 133 is so chosen that, when the Q output 91 is in its low state, the FET 123 back-biases the diode 121 to cause the constant current from the source 119 to flow through the conductor 131, the drain-sink path of the FET 123, and out of the terminal 133. When the Q output 91 is in its high state, however, the FET 123 no longer back-biases the diode 121, and the constant current from the source 119 then flows from the output connection 129 and through the diode 121, the capacitor 19, and the amplifier 3 out of the negative energizing terminal 15 thereof.

The Operation of the Apparatus of FIG. 1

When the FIG. 1 apparatus is in operation, the above-noted thermistor current flows substantially continuously with a value which is dependent upon that of the thermistor temperature. By virtue of the operation of the amplifier 5, the FET 7, and the source 59, said value of the thermistor current varies substantially linearly with the value of the thermistor temperature. Accordingly, the analog output signal produced from that current between the terminals 35 and 37 also varies substantially linearly with the thermistor temperature. As will be explained further below, the flip-flop 71 is caused to cycle continuously between its two states to cause its Q output at the terminal 91 to pulse at a rate which is proportional to the value of the thermistor current, and hence at a rate which is proportional to the thermistor temperature.

Figure 2:
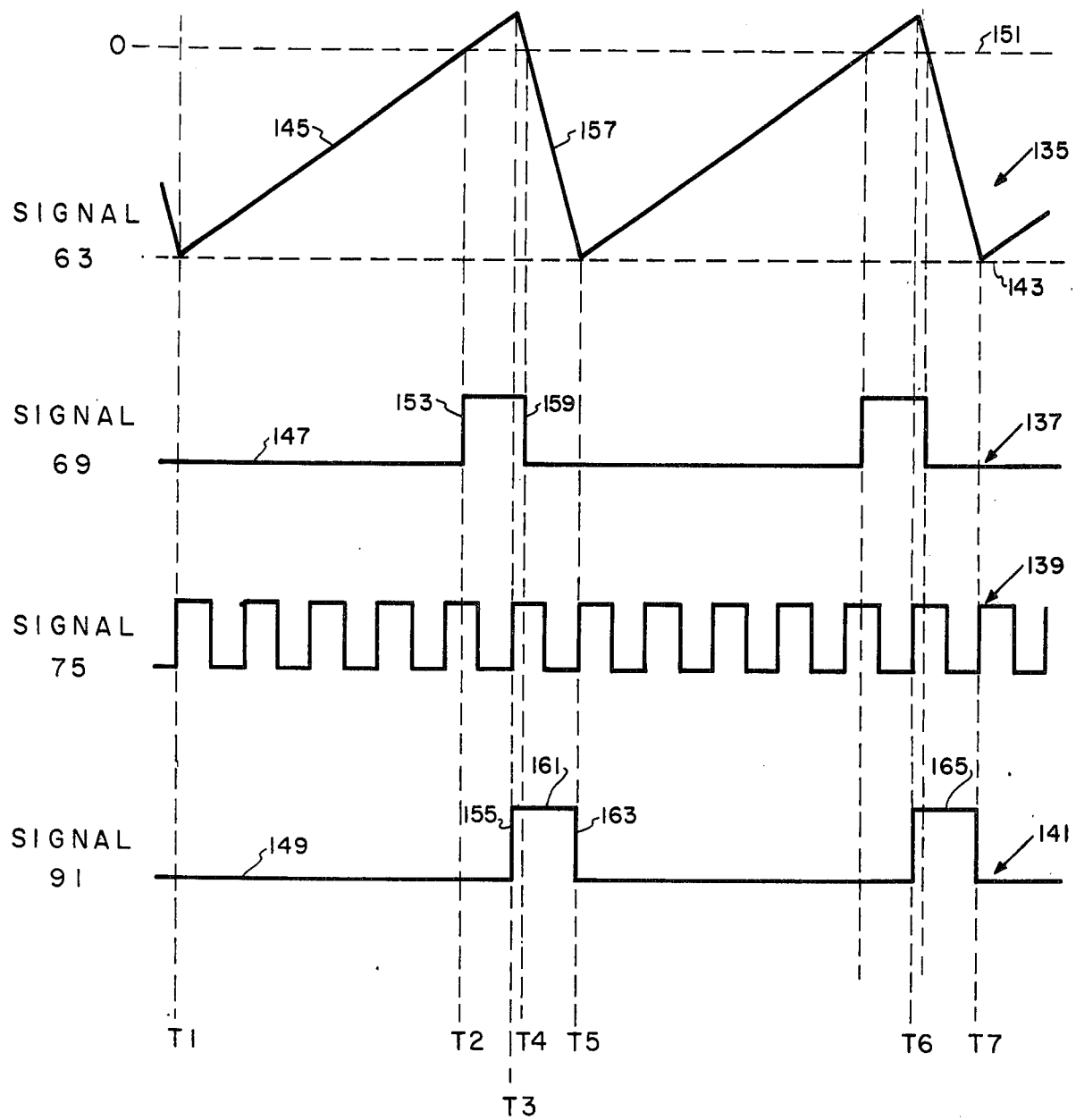
FIG. 2 is a series of curves illustrating the operation of the FIG. 1 apparatus.

The following description of the operation of the FIG. 1 apparatus is made with reference to the curves of FIG. 2. These curves show the variation, with respect to time, of the values of certain of the signals in the FIG. 1 apparatus for an assumed typical value of the temperature of the thermistor 1, and for two successive ones of the operating cycles and Q output pulses of the flip-flop 71.

In FIG. 2, the curve 135 shows the value of the voltage on the output terminal 17 of the integrating amplifier 3 as applied to the comparator input terminal 63. For convenience, that voltage will be referred to hereinafter as the signal 63. The FIG. 2 curve 137 shows the state of the signal on the flip-flop D input 69, which signal will be referred to hereinafter as the signal 69. The FIG. 2 curve 139 shows the pulsing clock signal at the output 75 which is applied to the flip-flop clock input 73 and to the counter input 81. That signal will be referred to hereinafter as the clock signal 75. Finally, the FIG. 2 curve 141 shows the state of the signal on the flip-flop Q output 91, which signal will be referred to hereinafter as the signal 91.

For convenience, the present description begins at a time T1 in the typical operation being considered, the time T1 being a time at which the signal 63 starts to rise from a base level 143 to which it was driven just prior to the time T1. This rising of the signal 63 is shown by the portion 145 of the curve 135.

At and following the time T1, the D input signal 69 is low, as shown by the portion 147 of the curve 137, and the Q output signal 91 is low, as shown by the portion 149 of the curve 141. Accordingly, the FET 123 is then on, the diode 121 is back-biased, and the current from the source 119 does not flow through the diode 121.

As shown by the portion 145 of the curve 135, the signal 63 rises linearly following the time T1. This increase in this signal is due to the charging action of the capacitor 19 as the thermistor current flows from the amplifier output terminal 17 through the capacitor 19 and thence through the thermistor 1. This current is substantially constant for any given value of the thermistor temperature. Thus, the signal 63 of the curve portion 145 is an integral signal of a value which is the time integral of the value of the thermistor current.

As shown by the curve portion 145, the signal 63, as it rises, passes through a reference level 151 at a subsequent time T2. This reference level 151 is determined by the voltage level on the comparator input terminal 65. Since the latter is connected to ground, the reference level 151 is shown in FIG. 2 as being at zero.

As the signal 63 crosses the reference level 151 at the time T2, the comparator 61 causes the signal 69 to go high, as shown by the portion 153 of the curve 137. Since the clock signal 75 is not going high at this time, however, the signal 91 does not change, but remains low.

The signal 63 continues to rise after the time T2 until the time T3, which is the next time at which the clock signal 75 goes high following the time T2. Since the signal 69 is already high at the time T3, the rise in the clock signal at that time causes the signal 91 to go high at that time, as shown by the curve portion 155 of the curve 141. This, in turn, turns off the FET 123 and unbiases the diode 121, whereby the current from the source 119 now flows through the diode 121 and through the capacitor 19 in opposition to the previously noted capacitor charging current. It is this opposing current which causes the above-noted termination of the rise of the signal 63 at the time T3.

Following the time T3, the above-noted opposing current from the source 119 forces the signal 63 to decrease relatively rapidly, as shown by the portion 157 of the curve 135. The signal 63 thus crosses back through the reference level 151 at a subsequent time T4, causing the signal 69 to go low at the time T4, as shown by the portion 159 of the curve 137. Since the clock signal 75 is not going high at this time, however, the signal 91 remains high, as shown by the portion 161 of the curve 141, and the opposing current continues to flow.

The signal 63 thus continues to drop from the time T3 until a subsequent time T5, which is the next time at which the clock signal 75 goes high following the time T3. Since the signal 69 is low at this time, the clock signal rise causes the signal 91 to go low, as shown by the portion 163 of the curve 141. As a result, the FET 123 now turns on, the diode 121 is once again back-biased, the opposing current from the source 119 stops flowing through the diode 121 and the capacitor 19, and the signal 63 stops decreasing and starts to increase again as it did at the time T1. The lowest value to which the signal 63 is so driven determines the base level 143 for the signal 63.

The significant result of the operation which has just been described is that the signal 91 has been made high for a fixed time period, T3-T5, which is equal to the time of one complete clock pulse, and that this has occurred at a time T3 following the time T1 such that the period T1-T3 is proportional to the rate of rise of the integral signal 63, and hence dependent upon the existing value of the thermistor current and temperature. The foregoing may be simply restated by saying that a pulse is produced in the signal 91 after a time lapse, following the time T1, which is dependent upon the thermistor temperature.

Following the time T5, the signal 63 rises and then falls as before, causing the flip-flop 71 to cycle again, and causing the signal 91 to be momentarily high or pulsed again. This time, the pulse in the signal 91 occurs in a time period T6-T7, as shown by the portion 165 of the curve 141.

Such cycling of the flip-flop 71 and pulsing of the signal 91 continue as long as the apparatus continues to operate. As a result, the signal 91 is a signal which pulses continually.

Since each of the time periods T1-T5 and T5-T7 is proportional to the thermistor temperature, as explained hereinafter, the pulse rate of the signal 91 is also proportional to the thermistor temperature. Thus, if the thermistor temperature has a higher value than that assumed in connection with the FIG. 2 example, the slope of the signal 63 curve portion 145 will be proportionally steeper, the time period T1-T3 will be proportionally shorter, and the repetition rate of the signal 91 pulses will be proportionally higher. Similarly, if the thermistor temperature has a lower value than that assumed in connection with the FIG. 2 example, the slope of the curve portion 145 will be proportionally flatter, the time period T1–T3 will be proportionally longer, and the pulse rate for the signal 91 will be proportionally lower.

During the operation of the FIG. 1 apparatus, a suitable means, not shown, periodically applies a reset command to the counter 79 by way of the connection 113, and simultaneously applies a reset command to the counter 97 by way of the connection 115. This is done at the rate at which it is desired to update the digital reading provided by the display device 109.

Each time that the counter 79 is so reset, the counter output 83 and the AND gate input 85 go high. This enables the AND gate 87 so that the pulses of the signal 91, which are continuously applied to the gate input 89, now pass to the input 95 of the counter 97. Since the latter was reset at the time at which the gate 87 was enabled, hereinafter referred to as the reset time, the counter 97 starts a new count of the signal 91 pulses at the reset time.

Also at the reset time, the counter 79 starts a new count of the pulses of the clock signal which is applied to the counter input 81. When the counter 79 has counted a predetermined number of such pulses, as determined by a count setting made by way of the connection 111, the counter output 83 and the gate input 85 go low. The time at which this occurs following the reset time establishes a count period of a length determined by the count setting — that is, by the predetermined number of counts which are set to take place before the counter output 83 is made to go low.

When the count period has expired and the counter output 83 and the gate input 85 go low, the gate 87 is disabled and hence terminates the application of the signal 91 pulses to the counter 97. The latter, therefore, then holds a final count which equals the number of pulses in the signal 91 which occurred during the count period. Since the pulse rate of the signal 91 is proportional to the thermistor temperature, the final count now in the counter 97 is proportional to the existing value of that temperature.

The counter 97 holds the above-noted final count until the next reset command appears on the connections 113 and 115. At that time, the counter 97 first transfers its final count to the latch 103, and then clears or resets to a predetermined or preset count established by way of the connection 117. Also at that time, the simultaneously reset counter 79 again allows the signal 91 pulses to reach the counter 97, so that the latter starts counting those pulses toward a new final count for the current count period.

At the above-noted time at which the counter 97 transfers its final count to the latch 103, the latter is updated, and now holds this new final count, which it decodes and applies to the display 109 so that the latter displays the new count in decimal form. The latch 103 and the display 109 continue to hold and display this count value until the next reset time, at which time a new final count is transferred to the latch 103 by the counter 97. This operation is continued so that the decimal display provided by the device 109 is updated at each reset time.

As previously noted, each final count which is made by the counter 97 and is displayed by the device 109 is proportional to the existing value of the thermistor temperature. In order to make each such counted and displayed number numerically equal to the existing temperature value according to a desired temperature scale, suitable scale factor adjustments or settings are made to the apparatus. These consist of making the count setting of the counter 79 and the preset count of the counter 97 correspond to the chosen temperature scale. Broadly speaking, the counter 79 count setting which corresponds to a given temperature scale is that which yields a count period duration which causes the number of signal 91 pulses which occur and are counted by the counter 97 during the count period to be numerically equal to the existing temperature value on the chosen scale less the preset count chosen for the counter 97.

For example, if the chosen scale is the Celsius scale, if the preset count of the counter 97 is made to be 0, and if the thermistor temperature is 30° Celsius at the time, the count setting for the counter 79 would be made to be that which enables the gate 87 for a count period of a length which allows 30 of the signal 91 pulses to reach and be counted by the counter 97 at the pulse rate corresponding to the 30° Celsius temperature. Once this count setting is so determined and made, it causes each final count produced by the counter 97 and displayed by the device 109 to be numerically equal to the number of degrees Celsius of the thermistor temperature for all values of that temperature which lie in the range over which the thermistor current is made proportional to the thermistor temperature.

In order to change the scale factor of the apparatus from the Celsius scale as set in the above-described example to the Fahrenheit scale, the count setting of the counter 79 is simply made to be 9/5 of the previously set Celsius value, and the preset count of the counter 97 is simply increased from 0 to 32. Then, for the assumed thermistor temperature of 30° Celsius, the counter 97 starts each of its counting actions at 32, and then adds to this preset count 9/5 of 30 counts, or 54 counts. This results in a final count of 86, which is the Fahrenheit temperature that corresponds to the temperature of 30° Celsius.

It is believed to be clear from the foregoing explanation that the desired scale factor of the disclosed apparatus is readily established and changed simply by setting the count at which the counter 79 stops the counter 97 from counting the signal 91 pulses, and by setting the preset count for the counter 97. Since these settings are digital ones, the provision of the adjustable scale factor capability in the apparatus does not introduce additional error.

The operation of the apparatus which has been described above may be summarized mathematically as follows. Over a long period of time, the net charge on the capacitor 19 remains unchanged, as can be seen from the curve 135. Therefore, $$(I)(T) = (ID - I)(TD)$$

or $$T + TD = (ID)(TD)/I,$$

where
  $I$ is the thermistor current
  $T$ is the time period T1–T3
  $ID$ is the constant opposing current TD is the fixed clock period T3–T5 and
T + TD is thus the integrator and flip-flop period T1–T5.

If the counter 97 is allowed to count for a time period (M) (TD), where M is a number much greater than 1, the final count on the counter 97 at the end of the period (M) (TD) is $$\frac{(M)(TD)}{T+TD} = \frac{\frac{(M)(TD)}{(ID)(TD)}}{I} = \frac{(M)(I)}{ID}$$

which is a number that is proportional to the thermistor current, and hence the thermistor temperature, and that is dependent only on the digital number M, ID being constant. Consequently, a direct numerical temperature display or readout on the device 109 according to any desired temperature scale may be obtained by setting the proper number M into the counter 79 and the required preset into the counter 97. The number M is, of course, the above-described number of clock signal pulses which are counted by the counter 79 before it turns off the gate 87 and terminates the counting action of the counter 97 in each update of the count in the latch 103.

By way of illustration and example, and not by way of limitation, it is noted that typical component types and values for the FIG. 1 apparatus are as follows:

Amplifier 3 — Type LM308 followed by a 2N3904 transistor
Amplifiers 5, 9 — Type LM308A
FET 7 — Type 2N4222
Capacitor 19 — 0.0033 Mfd.
Comparator 61 — Type LM311
Flip-flop 71 — Type 74LS74
Clock 77 signal pulse length — 35.2 μs.
Counter 79 — Type 4040 + Type 4024
Gate 87 — Type 4081
Counter 97 — 4 type 74LS196
Latch 103 — 3 type 9374
Diode 121 — Type C3206
FET 123 — Type 2N4342

The capacitance of the capacitor 19, the clock signal frequency, and the other parameter values in the apparatus must be so chosen that the amplifier 3 has not saturated, but is still causing the signal 63 to be rising, when the clock signal pulse following the time T2 appears. Similarly, the signal 63 must still be falling below the reference level 151 at the time T5 at which the next clock signal pulse appears. The reference level 151 may, of course, be other than zero. The value of the constant opposing or discharging current ID should be at least twice the value of the largest value of thermistor current to be encountered. For displaying the temperature directly in degrees Celsius, and assuming a clock signal pulse length of 35.2 microseconds, the count M for the counter 79 may well be 12,800, with the counter 97 preset to zero. Then, for displaying the temperature directly in degrees Fahrenheit, the count M would be changed to 23,040, and the preset value would be made 32.

It is believed to be clear from the foregoing description that the described apparatus according to the present invention fulfills the objects stated herein. Thus, it has been shown that the apparatus provides analog and digital outputs which are separately derived so that an error in one does not introduce an error into the other, and that non-linearity compensation and scale factor changes are readily effected in the apparatus without the introduction of appreciable errors into either of the outputs.

The embodiments of the invention in which an exclusive property or privilege is claimed are defined as follows:

1. Measuring apparatus for providing both an analog output and a digital output which are representative of the value of a condition to which a condition sensing element is exposed, comprising a condition sensing element having an electrical characteristic of a value dependent upon the value of the condition to which the element is exposed, means connected to said element for passing a current through said element to cause the value of said current to be a function of said charactistic of said element, and for deriving an integral signal of a value which is the time integral of the value of said current, means connected to receive said integral signal and responsive to the value thereof for shifting that value to a base level each time that that value crosses a reference level, and for producing a pulse in a second signal upon each such shift, means connected to receive said second signal for counting said pulses thereof for a predetermined time period to provide a numerical count which is a function of the value of said current, and for providing a digital output representative of said count and hence of the digital value of said condition, and means connected to respond to the value of said current for producing an analog output signal which is a function of the value of said current and hence is representative of the value of said condition.

2. Measuring apparatus for providing both an analog output and a digital output which are representative of the value of a condition to which a condition sensing element is exposed, comprising a condition sensing element having an electrical characteristic of a value dependent upon the value of the condition to which the element is exposed, means connected to said element for passing a current through said element to cause the value of said current to be a function of said characteristic of said element, means responsive to said value of said current for producing a signal which pulses at a rate dependent upon said value of said current, means connected to receive said signal for counting said pulses thereof for a predetermined time period to provide a numerical count which is a function of the value of said current, and for providing a digital output representative of said count and hence of the digital value of said condition, and means connected to respond to the value of said current for producing an analog output signal which is a function of the value of said current and hence is representative of the value of said condition.

3. Measuring apparatus for providing both an analog output and a digital output which are representative of the value of a condition to which a condition sensing element is exposed, comprising a condition sensing element having an electrical characteristic of a value dependent upon the value of the condition to which the element is exposed, means connected to said element for passing a current through said element to cause the value of said current to be proportional to the value of said characteristic of said element, means responsive to said value of said current for producing a signal which pulses at a rate which is proportional to said value of said current, means connected to receive said signal for counting said pulses thereof for a time period in which the number of said pulses which is produced is equal to the numerical value of said characteristic according to a predetermined scale, means responsive to the number of said pulses counted in said time period to provide a decimal representation of said number and hence of said value of said characteristic according to said scale, and means connected to respond to the value of said current for producing an analog output signal which is proportional to the value of said current and hence to the value of said condition.

4. Measuring apparatus for providing both an analog output and a digital output which are representative of the value of a condition to which a condition sensing element is exposed, comprising a condition sensing element having an electrical characteristic of a value dependent upon the value of the condition to which the element is exposed, means connected to said element for passing a current through said element to cause the value of said current to be a function of said characteristic of said element, compensating means connected to said element and responsive to said value of said current for adjusting that value to keep it proportional to said value of said condition, means responsive to said value of said current for producing a signal which pulses at a rate proportional to said value of said current, means connected to receive said signal for counting said pulses thereof for a predetermined time period to provide a numerical count which is proportional to the value of said current, and for providing a digital output which is representative of said count and hence is proportional to the digital value of said condition, and means connected to respond to the value of said current for producing an analog output signal which is proportional to the value of said current and hence to the value of said condition.

5. Temperature measuring apparatus for providing both an analog output and a digital output which are representative of the temperature to which a temperature sensing element is exposed, comprising an element having an electrical resistance of a value dependent upon the value of the temperature to which the element is exposed, means connected to said element for passing a current through said element to cause the value of said current to be a function of the resistance and the temperature of said element, and for deriving an integral signal of a value which is the time integral of the value of said current, means connected to receive said integral signal and responsive to the value thereof for shifting that value to a base level each time that that value crosses a reference level, and for producing a pulse in a second signal upon each such shift, means connected to receive said second signal for counting said pulses thereof for a predetermined time period to provide a numerical count which is a function of the value of said current, and for providing a digital output representative of said count and hence of the digital value of said temperature, and means connected to respond to the value of said current for producing an analog output signal which is a function of the value of said current and hence is representative of said temperature.

6. Temperature measuring apparatus for providing both an analog output and a digital output which are representative of the temperature to which a temperature sensing element is exposed, comprising an element having an electrical resistance of a value dependent upon the value of the temperature to which the element is exposed, means connected to said element for passing a current through said element to cause the value of said current to be proportional to the value of the temperature of said element, means responsive to said value of said current for producing a first signal which pulses at a rate which is proportional to said value of said current, means connected to receive said first signal for counting said pulses thereof for a time period in which the number of said pulses so counted is equal to the numerical value of said temperature according to a predetermined temperature scale, means responsive to said number of said counted pulses to provide a decimal representation of said number and hence of said temperature value according to said scale, and means connected to respond to the value of said current for producing an analog output signal which is proportional to the value of said current and hence to the value of said temperature.

7. Apparatus as specified in claim 6, wherein there is included means for producing a pulsing clock signal, wherein said means connected to receive said first signal includes a first counter and a second counter, wherein said first counter is connected to receive and to count the pulses of said clock signal, wherein said time period is that in which said first counter receives and counts a predetermined number of the last-mentioned pulses, and wherein said second counter is connected to said first counter, and is connected to receive said first signal and to count said pulses thereof only while said first counter is counting said predetermined number of said clock signal pulses.

8. Apparatus as specified in claim 7, wherein said second counter starts each of its counts of said pulses of said first signal at a preset count.

* * * * *